Nov. 22, 1966    H. STAUFERT    3,286,950
ARRANGEMENT FOR DETACHABLY CONNECTING A BOBBIN HOLDER
TO A SUSPENSION RAIL, CREEL, OR THE LIKE
Filed Sept. 18, 1964    3 Sheets-Sheet 3
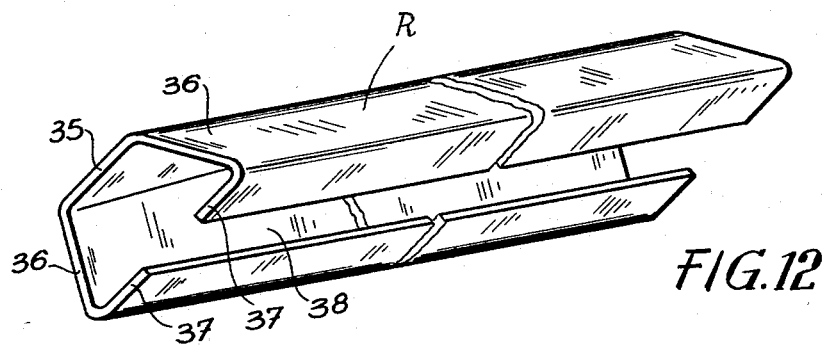
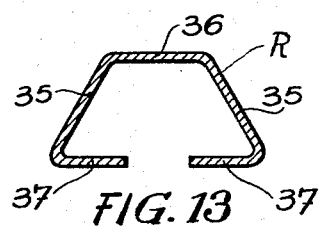
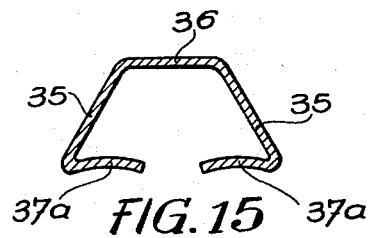
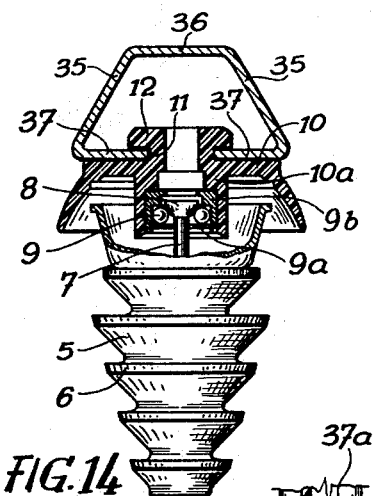
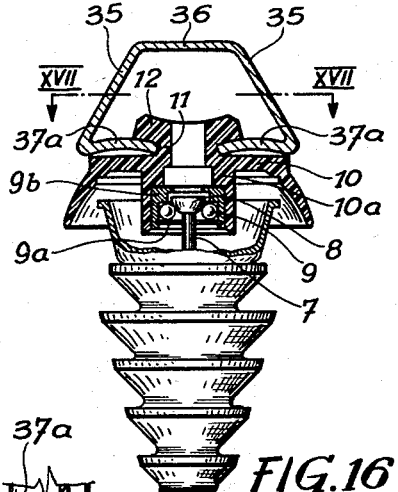
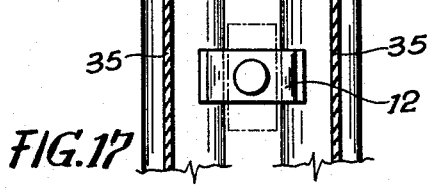

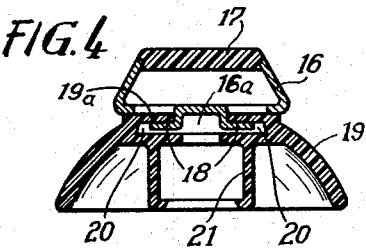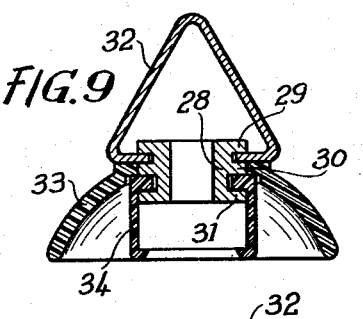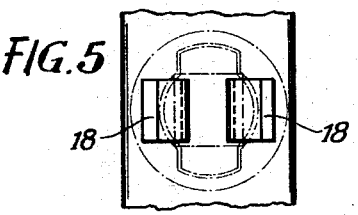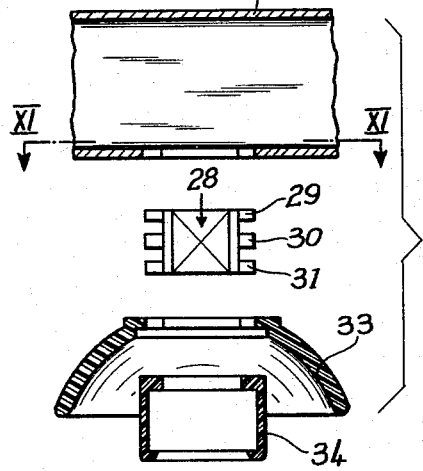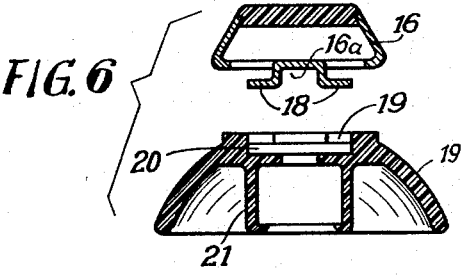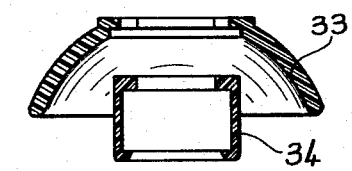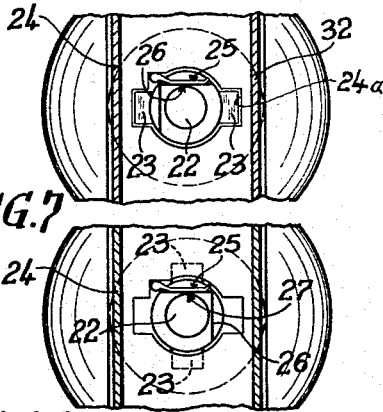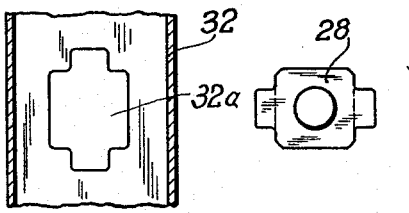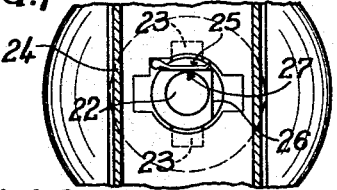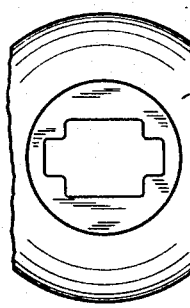

United States Patent Office 3,286,950
Patented Nov. 22, 1966

3,286,950
ARRANGEMENT FOR DETACHABLY CONNECTING A BOBBIN HOLDER TO A SUSPENSION RAIL, CREEL, OR THE LIKE
Helmut Staufert, Wildunger Strasse 34, Stuttgart-Bad Cannstatt, Germany
Filed Sept. 18, 1964, Ser. No. 397,559
Claims priority, application Germany, Sept. 21, 1963, St 21,106; July 3, 1964, St 22,346
8 Claims. (Cl. 242—130.2)

The present invention relates to an arrangement for detachably connecting a bobbin holder to a suspension rail, creel or the like. With heretofore known spinning machines, bobbin holders are stationarily connected to a suspension rail, creel or the like and as a rule are firmly screwed thereto so that tools are required for detaching the bobbin holder from an connecting the bobbin holder to a creel, the suspension rail or the like. Such connection and detachment requires relatively much time. The operation of the machine does not require a later detachment of the bobbin holder, and there merely exists the necessity to detach the bobbin by a few manual operations from the bobbin holder and to place the bobbin on the bobbin holder. Nevertheless, it is frequently desired also to be able to remove the bobbin holder from the creel in order to clean the same from lint and fiber dust or the like and to lubricate its movable parts in order to maintain the bobbin holder in its best operative condition. A cleaning or lubrication of the bobbin holder on the spot requires a stoppage of the machine or at least of the respective spindle and moreover is made more difficult by the fact that the bobbin holders are at a level which cannot well be reached by the operator.

Based on the above findings, it is an object of the present invention to provide a connecting arrangement for bobbin holders, which will overcome the above mentioned drawbacks.

It is another object of this invention to provide a connecting arrangement for bobbin holders which will greatly facilitate the mounting and dismounting of bobbin holders from a suspension rail, creel or the like.

It is still another object of this invention to provide an arrangement as set forth in the preceding paragraph, which will reduce the time for mounting and dismounting a bobbin holder to a minimum and thereby will also reduce the required stoppage time for the machine to a minimum.

These and other objects and advantages of the invention will appear more clearly from the following specification in connection with the accompanying drawings, in which:

FIG. 4 is a section through a modified connecting arrangement according to the invention for a bobbin holder.

FIG. 5 is a bottom view of the suspension rail without bobbin holder.

FIG. 6 is a view which illustrates in section the bobbin rail and cover cap of the bobbin holder according to FIG. 4 directly prior to the mounting of these parts.

FIG. 7 is a section through a modified arrangement of the invention and shows the connecting device from the top prior to an axial mounting thereof.

FIG. 8 is a view which represents a showing similar to that of FIG. 7 after the mounting operation has been completed.

FIG. 9 is a view which shows a bobbin connection by means of a separate connecting body with radially directed extensions.

FIG. 10 is a view which shows the components of the embodiment of FIG. 9 directly prior to the mounting thereof.

FIG. 11 is a top view of the components shown in FIG. 10, the suspension rail being shown in section along line XI—XI of FIG. 10.

FIG. 12 is an isometric view of a suspension rail according to the invention having a longitudinal gap between the legs and having a special cross sectional contour.

FIG. 13 is a section through the rail according to FIG. 12.

FIG. 14 is a view which shows the suspension rail of FIG. 13 with a bobbin holder which latter is provided with a joint according to FIGS. 1 to 3.

FIG. 15 is a view which shows a section through a suspension rail which differs from that of FIG. 13 in that the legs are somewhat arched.

FIG. 16 is a view which illustrates the suspension rail of FIG. 15 with a bobbin holder provided with a connecting joint according to FIGS. 1 to 3.

FIG. 17 is a horizontal section along the line XVII—XVII of FIG. 16.

Figure 1:
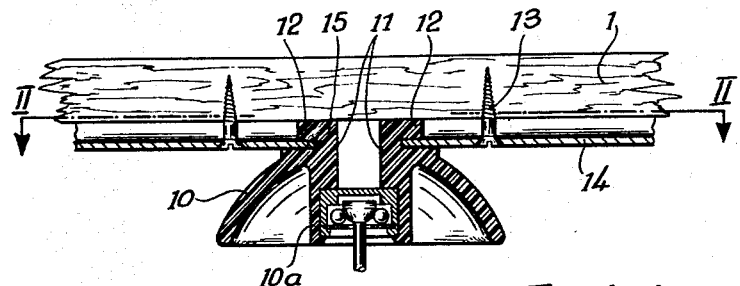
FIG. 1 is a section through a connecting arrangement according to the invention for a bobbin holder to a wooden creel.

The arrangement according to the present invention for detachably connecting a bobbin holder to a suspension rail, creel or the like is characterized in that the connecting device is designed at a plug-in and turn joint. Consequently, it is merely necessary to introduce two parts into each other and to turn the same relative to each other in order to complete the mounting of the bobbin holder to the suspension rail, creel or the like, and, of course, corresponding inverse movements will effect a dismounting of the bobbin holder. Thus, the arrangement according to the present invention represents a fast connecting joint.

According to a further development of the present invention, the plug-in-turn joint may be realized by providing the suspension rail or the upper end of the bobbin holder with an axially directed protrusion having radially extending ears or the like while the other part is provided with an opening corresponding to the cross section of said protrusion with ears. The area adjacent to said opening is engaged by said ears after a corresponding relative turning movement of the parts. Such plug-in-turn connection may when fastening the bobbin holder be so handled that that part which is provided with the opening is slipped on the axially directed protrusion whereupon by a relative rotation of the parts it is brought about that the ears catch behind the area adjacent to the opening so that the bobbin holder is axially supported and safely suspended.

The cross section of the protrusion may be polygonal, and the corners of the protrusion and/or the confining surfaces of the opening may be elastically deformable. Such an arrangement makes it possible that in view of the plane confining surfaces of the protrusion in cooperation with the confining surfaces of the opening, the turning position of the parts relative to each other will be fixed while in view of the elasticity of the corners of the protrusion and/or the confining surfaces of the opening, the turning of the joint parts relative to each other will be made possible.

According to another embodiment of the invention, the protrusion may have a polygonal cross section or a circular cross section with chordal sections, and the opening for receiving the protrusion is of circular contour the maximum diameter of which corresponds to the maximum diameter of the protrusion while a leaf spring extends on the chord. The said leaf spring will, when introducing the protrusion into the opening and turning the components of the joint connection relative to each other, engage a plane side surface of the protrusion so that the proper lock is obtained which will prevent an undesired rotation in the opposite direction. The turning in said last mentioned opposite direction is possible only when employing a certain force for deforming the leaf spring.

Instead of forming or connecting the axially directed protrusion to one of the two inter-engaging components, it is also possible according to the present invention to provide the protrusion by a separate plug stud with substantially round or square cross section having radially directed pairs of ears one behind the other. These pairs of ears cooperate with openings or sockets in the suspension rail and in the bobbin holder. The ears of the plug will, after introduction into said openings and after turning the parts relative to each other, catch behind the area adjacent to said openings. In this way, a connecting joint is created which permits an easy dismounting of the parts while also permitting the easy connection of the parts of the bobbin holder.

More specifically, the plug stud may have three pairs of ears one behind the other. A cover cap when mounted may positively embrace the intermediate pair of ears and may be clamped in between the upper bobbin holder end and the suspension rail. Inasmuch as said cap positively embraces a pair of ears, it is possible by means of said cap to turn the plug stud so that a loosening or tightening of the joint for dismounting or mounting the bobbin holder can be carried out on the suspension rail.

According to a further embodiment of the invention, means are provided to simplify the plug-turning connection between suspension rail and bobbin holder by a special design of the suspension rail. Simultaneously, there is provided the possibility of varying the distances of the holders from each other on said rail according to requirements so that one and the same suspension rail may be employed for suspending yarn bodies of any random diameter.

To this end, the invention provides that the suspension rail is designed as a thin-walled hollow structural rail with trapezoidal cross section while the basis as opening for the shank portion of the plug-turning joint of the bobbin holder has a gap extending over the entire length of the rail. It is in this gap that the bobbin holder shank after a plug in and turning movement is held by a radially and/or axially directed clamping force. A bobbin holder is adapted by means of its shank as plug-in turn joint to be introduced into such suspension rail and is furthermore adapted to be turned preferably by 90° so that its radially directed protrusion will on both sides of the gap extend over the bottom legs of the trapezoidal stud shank. When turning the bobbin holder, locally a certain widening of the gap or an elastic deformation of the shank of the bobbin holder will occur so that the bobbin holder after its 90° turning movement will be held fast in a clamping manner. Due to the fact that the bobbin holder can be introduced at any desired area into the gap of the suspension rail, any random position for the bobbin holder over the length of said suspension rail will be possible. In view of the type of the profile of the suspension rail, namely the trapezoidal cross section, the suspension rail has a considerably higher resistance moment than a suspension rail of a triangular cross section the material cross section of which, however, corresponds to the material cross section of the suspension rail according to the invention. This is due to the fact that the bent portion of the trapezoidal cross sections are less sharp so that when bending the suspension rail from a sheet metal strip or a strip of synthetic material, less expansion of the material will occur at said bent portions. Thus, at said bent portions, a higher resistance against deformation will be maintained, and a widening of the gap when plugging in and turning the bobbin holder remains restricted locally to the plug-in area. Thus, it will not bring about a widening of the gap over the entire length of the suspension rail. Such widening would entail the drawback that only few of the bobbin holders could be firmly clamped in, while a plurality of bobbin holders distributed over the length of the rail would bring about a widening of the gap along its entire length. This would make impossible a clamping of intermediate bobbin holders between the lower legs of the trapezoid.

In order to maintain an effective clamping and to assure a permanent clamping, it is also possible according to the invention to make the gap somewhat narrower than the smallest diameter of the shank portion of the plug-in turn joint of the bobbin holder. This brings about that either the shank portion will during its rotation undergo an elastic deformation namely a tapering, or the slot will, within the range of the plugged-in shank portion, undergo a certain elastic widening.

Since, under circumstances, it is possible that the gap might widen to such an extent that some bobbin holders will be suspended on the suspension rail without being properly clamped in, it is possible according to a further development of the invention to obtain a clamping effect by pressing said lower legs at both sides of the gap out of the plane of the leg toward at least one side, for instance by shaping them arched or saddle-like, so that the radially directed protrusions of the shank portion will when turning the shank portion by 90° be elastically bent upwardly in conformity with the profile. This equals an elastic widening of the restriction in the shaft portion below the radially directed protrusions so that an axially directed clamping force will be produced which will prevent a displacement of the bobbin holder in the longitudinal direction of the gap and will also prevent an undesired rotation thereof.

While with the first embodiment of the invention there is produced a radial clamping effect, with the second embodiment an axial clamping is produced. Both types may be used together by causing a cooperation between the width of the gap and the shape of the lower legs.

Figure 2:
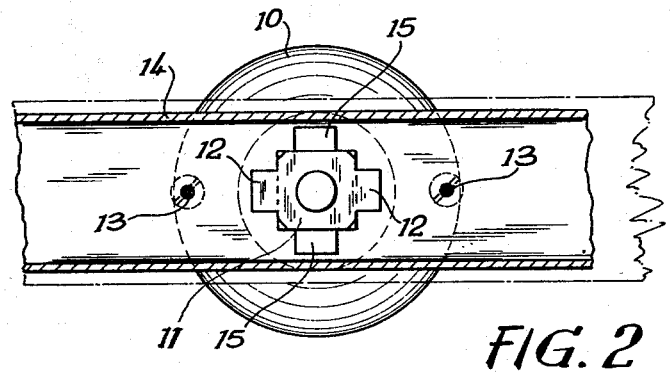
FIG. 2 is a section along the line II—II of FIG. 1.
Figure 3:
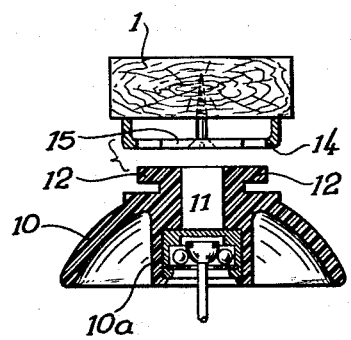
FIG. 3 is a vertical section through the creel and the connecting body and shows the upper portion of the bobbin holder prior to the mounting thereof.

Referring now to the drawings in detail and FIGS. 1 to 3 thereof in particular, the arrangement shown therein comprises a suspension rail or creel 1 and the upper portion of a bobbin holder with cover cap 10. Cover cap 10 is provided with a protrusion 11 for insertion into the suspension rail 1, said protrusion 11 being formed as an integral part of cap 10. The protrusion 11 which forms a shank has a square cross section as can best be seen from FIG. 2. Protrusion 11 has its upper end provided with two radially directed ears 12. The arrangement furthermore comprises a suspension rail plate 14 with an opening 15 the cross section of which corresponds to the cross section of protrusion 11 with ears 12. As will be evident from the drawing, suspension rail plate 14 is connected to rail or creel 1 by means of screws 13. The starting position during the assembly operation is illustrated in FIG. 3 which in addition to showing the suspension rail or creel also shows details of the arrangement prior to the assembly and shows the same in a section perpendicular to the section of FIG. 1.

After the protrusion 11 of cover cap 10 has been moved axially upwardly (see FIG. 3) through plate 14, cap 10 is turned by 90° so that it will occupy the position shown in FIG. 1 in which the ears 12 rest upon plate 14. In view of the square cross section of shank portion 11 and opening 15, it will be evident that during the turning of cap 10 relative to creel 1 an elastic deformation of the protrusion 11 must take place. Therefore, with this embodiment, at least the shank portion 11 consists of an elastic material. In view of the square shape of shank portion or protrusion 11 and opening 15, the locations of the parts relative to each other are fixed in the starting position as well as after turning by 90° so that an undesired turning back will be impossible. The just described connection according to the present invention thus represents a simple plug-in turn connection which makes possible a simple assembly and disassembly of bobbin holder and creel without the danger that an undesired detachment can occur. The detachment or disassembly is effected by turning in the reverse direction and by an axial withdrawal. FIGS. 1 and 3 additionally show the detail design of cap 10 which includes an annular sleeve section 10a receiving the roller pendulum bearing for the bobbin holder body proper.

According to the embodiment illustrated in FIGS. 4, 5 and 6, the suspension rail or creel 16 which forms a hollow rail is provided with a protrusion 16a. The upper end of rail 16 is closed by a strip 17. Protrusion 16a is formed by pressing two ears 18 out of rail 16 in the manner shown clearly in FIG. 6. As will be seen from FIG. 4, the ears 18 engage from below the upper wall portion 19a of cap 19 which rests against rail 16. Ears 18 extend into a cutout or recess 20 in cap 19 so that the latter is properly held in said rail. The opening in the upper wall portion 19a corresponds in shape to that of the ears 18 so that by axially connecting the parts, the upper wall portion 19a will be pressed against the bottom side of rail 16. By turning cap 19 by 90°, the cap is properly arrested and located as indicated in dot-dash lines in FIG. 5. The assembly of the parts 19 and 16 will be evident from FIG. 6 which shows the suspension rail 16 in section and therebelow cover cap 19 in its starting position. The cylindrical sleeve 21 of cap 19 is intended for receiving the bearing body of the bobbin holder proper.

With the embodiments described so far, the basic shape for the protrusion is a square cross-section. However, the invention may also be realized with a circular cross-section for the protrusion, which has, for instance two chord segments as illustrated in FIGS. 7 and 8. One chord surface 27 is located on one side on which there is provided a radially directed ear 23. This is clearly shown in FIG. 7 in which the protrusion of a bobbin holder is designated with the reference numeral 22 and has an ear 23. The protrusion 22 and ears 23 cooperate with a corresponding passage 24a in suspension rail 24 (see FIG. 7). The passage 24a has an annular contour while a leaf spring 25 represents a chord which when entering the protrusion through said passage rests against a second chord surface 26 of the protrusion 22. By turning the bobbin holder by 90° and thereby turning the protrusion 22 by 90°, the first chord surface 27 will rest against leaf spring 25 while protrusion 22 will by means of leaf spring 25 be arrested in its end position. The starting position is illustrated in FIG. 7 whereas FIG. 8 illustrates the end position from which it will be evident how ears 23 rest against rail 24 so that an axial removal will no longer be possible.

The embodiment illustrated in FIGS. 9, 10 and 11 illustrates in detail a connecting device the main part of which is formed by a plug or stud 28 of square-shaped outer contour and which has formed thereon at opposite sides thereof three ears each, namely the ears 29, 30 and 31. The suspension rail 32 is provided with a passage of similar cross section. A passage of the same magnitude is also provided in cover cap 33 and in the sleeve body 34 for receiving the bearing of the bobbin holder. When effecting the assembly, ears 29 extend through the lower wall of rail 32 and rest against the said lower wall as soon as stud 28 is being turned by 90°. Similarly, also cover cap 33 and sleeve body 34 are slipped upon stud 28 while cap 33 positively embraces ears 30, and the bearing sleeve 34 alone is being turned by 90° so that in this way cap 33 will be located between the lower wall of suspension rail 32 and the upper surface of bearing sleeve 34 which in its turn rests upon ears 31 of stud 28. In this way, by means of stud 28, not only will cap 33 be detachably connected to suspension rail 32, but at the same time said cap 33 will be firmly connected to the bearing sleeve 34. Rotation of stud 28 may be effected by means of cap 33 which extends around ears 30 so that the turning of said stud can be effected from the outside.

The assembly of the components will be particularly clear from FIG. 11 which in a section taken along the line XI—XI of FIG. 10 shows the suspension rail 32 with passage 32a therein for the protrusion and also shows in top view the remaining parts 28, 33 and 34 in their positions which they occupy in FIG. 10.

The various embodiments illustrate plug-in-turn connections which make possible an assembly and disassembly of suspension rail and bobbin holder by one hand and in a single operation. A mere axial connecting movement is necessary and a subsequent turning by 90°, whereas for disassembling purposes the same movements have to be carried out in reverse sequence. It is thus possible for purposes of lubricating and cleaning a bobbin holder, to remove the same during operation and to reassemble the same or to replace the same without long disassembling operations.

In contrast to the suspension rail described so far, it is also possible according to FIGS. 12 to 17, to make the suspension rail from one strip, for instance a sheet metal strip, bent into the shape of a trapezoid. The upper leg is designated with the reference numeral 35, whereas the two lateral legs have been designated with the reference numeral 36. The two basis or lower legs are designated with the reference numeral 37 and therebetween confine a longitudinal gap 38. According to the arrangement of FIG. 13, the two legs 37 are located in one plane, whereas according to the embodiment of FIG. 15 the two legs which have been designated with the reference numeral 37a are slightly arched.

FIG. 14 shows a suspension rail with the cross section clearly indicated in FIG. 13, to which a bobbin holder 5 has been connected by means of a plug-in-turn connection. The bobbin holder 5 may consist for instance of rubber and tapers conically in downward direction with annular ribs 6 which assure the clamping seat for the bobbin to be held thereby. The bobbin holder 5 is described more specifically in my U.S. Patent No. 2,914,271. The bobbin holder illustrated in FIG. 16 is of the same construction.

The two bobbin holders according to FIGS. 14 and 16 have an upwardly directed shank 7 with a bearing head 8 by means of which shank 7 rests on antifriction bodies 9 which are designed as balls. The antifriction bodies 9 in their turn rest on an annular disc 9a which is held in a bearing body 9b. The bearing body 9b is mounted in a hub 10a of a cap 10 of elastic material which has its top side provided with the shank 11. Radially connected to and formed to the end of shank 11 are protrusions 12. The bottom edge of protrusions 12 is spaced from the top surface of cap 10 by a distance about corresponding to the thickness of legs 37 of suspension rail R. Thus, in shank 11 between protrusions 12 and cap 10 there is a constriction which following the insertion of shank 11 through gap 38 and the turning of said cap is engaged by legs 37 in conformity with FIG. 13 or by legs 37a in conformity with FIG. 15.

The cross section of shank 11 is rectangular as shown in FIG. 17. The diameter which is perpendicular to the drawing plane corresponds to the width of gap 38, whereas the diameter located in the drawing plane is somewhat larger so that in the position of FIG. 14 gap 38 will over the position in FIGS. 12 and 13 have undergone a slight broadening which will assure a clamping of shank 11 in gap 38. The introduction of shank 11 with cap 10 and bobbin holder 5 is effected in a position which is offset by 90° with regard to the showing in FIG. 14. In this position, which is indicated by dash lines in FIG. 17, protrusions 12 extend in the direction of gap 38 so that shank 11 can be freely introduced into gap 38. Subsequently, cap 10 with shank 11 is turned by 90° so that protrusions 12 will extend over legs 37 of the suspension rail and at the same time the marginal portions of legs 37 will engage the said constriction in shank 11 while being clamped against the lateral surfaces of shank 11 which are parallel to each other. The disconnection or disassembly of the bobbin holder is effected by a turning movement in reverse direction by 90° followed by an axial withdrawal.

According to FIGS. 15 to 17, the assembly of suspension rail and bobbin holder and the disassembly are effected in the same manner. By arching legs 37a, the constriction between the radial protrusions 12 and cap 10 will during the turning movement by 90° undergo a clamping broadening. This broadening, in conformity with FIG. 17, brings about that bobbin holder 5 will be firmly held by an axial clamping on the suspension rail.

Legs 37a (FIGS. 15 to 17) may, of course, also be curved in a different way. It is merely necessary that during the turning movement by 90° of cap 10 with shank 11 legs 37a will extend between cap 10 and the radial protrusions 12 while an axial clamping effect is produced. This clamping may be supplemented by a radial clamping when the width of the gap is less than the narrowest cross section of the constriction in shank 11.

As will be evident from FIGS. 12 to 17, the location of the bobbin holder on the suspension rail is not fixed in longitudinal direction of the bobbin holder. It is rather possible to connect a bobbin holder at any desired point along the length of the suspension rail. This affords the possibility of suspending yarn bodies with different diameters on one and the same suspension rail and of correspondingly selecting the distances of the bobbin holders from each other in conformity with the respective requirements.

It is, of course, to be understood that the present invention is, by no means, limited to the particular constructions shown in the drawings but also comprises any modifications within the scope of the appended claims.

What I claim is:

1. In combination: substantially horizontally extending creel means, supporting means for supporting bobbin holder means, said supporting means being provided with a substantially vertical elastically deformable extension having radially extending ears thereon and having a substantially plane side wall portion, said creel means having passage means therein corresponding in contour to the cross-sectional contour of said extension with said radially extending ears thereon, whereby after introduction of said extension through said passage means and rotation of said extension in one direction by approximately 90° said supporting means is suspended on said creel means, and means associated with said creel means and engaging said plane side wall portion in a locking manner in response to the rotation of said extension by approximately 90° in said one direction.

2. In combination: creel means including plate means having a top and bottom surface, supporting means for supporting bobbin holder means, said supporting means having shoulder means of elastically deformable material for engagement with said bottom surface and also having an extension of elastic material with radially extending ears for engagement with said top surface, said elastically deformable extension including a portion of polygonal cross section, said plate means having passage means therethrough of a contour corresponding to the cross-sectional contour of said extension with slots for permitting passage of said ears therethrough, said ears being spaced from said shoulder by a distance slightly less than the thickness of said plate means adjacent to said passage means so that said ears when in offset position with regard to said passage means will frictionally engage said top surface while said passage means prevents said extension from turning accidentally.

3. In combination: creel means including plate means having a top and bottom surface, supporting means for supporting bobbin holder means, said supporting means having shoulder means for engagement with said bottom surface and also having an extension of polygonal cross-section with radially extending ears thereon for engagement with said top surface, at least the edge portions of said extension being of elastic material, said plate means having passage means therethrough of a contour corresponding to the cross-sectional contour of said extension with said ears thereon for receiving a portion of said extension, said ears being spaced from said shoulder by a distance approximately equalling the thickness of said plate means adjacent to said passage means.

4. In combination: creel means including plate means having a top and bottom surface, supporting means for supporting bobbin holder means, said supporting means having shoulder means for engagement with said bottom surface and also having an extension of polygonal cross-section with radially extending ears thereon for engagement with said top surface, said plate means having passage means therethrough of a contour corresponding to the cross-sectional contour of said extension with said ears thereon, at least the edge portion of said extension means being of elastic material, said ears being spaced from said shoulder by a distance approximately equalling the thickness of said plate means adjacent to said passage means.

5. In combination: a first member forming a suspension rail, a second member forming supporting means for supporting bobbin holder means, one of said members having passage means therein, the other one of said two members having an extension adapted selectively to enter said passage means and to disengage the same, said extension having a circular cross-section with a segmental cutout so that said extension will have a plane flank and said passage means likewise having a circular cross-section of a diameter corresponding to the largest diameter of said extension, and yieldable means connected to said one member and operable detachably to engaged said flank and hold said extension in its respective position when the latter has entered said passage means.

6. In combination: a first member forming a suspension rail, a second member forming supporting means for supporting bobbin holder means, one of said members having passage means therein, the other one of said two members having an extension adapted selectively to enter said passage means and to disengage the same, said extension having a polygonal cross-section and said passage means likewise having a polygonal cross-section corresponding to the polygonal contour of said extension, at least the edge portions of said extension being of elastic material, and yieldable means connected to said one member and operable detachably to engage and hold said extension in its respective position.

7. In combination: creel means having its major extension in horizontal direction and having substantially vertical passage means therein, bobbin holder means including sleeve means having its axis substantially perpendicular to the direction of the major extension of said creel means and having that end of said sleeve means which faces said creel means provided with an opening, and plug means having its axial direction likewise substantially perpendicular to the direction of the major extension of said creel means, said plug means being provided with a plurality of ears being spaced from each other in axial direction of said plug means, said passage means and said opening of said sleeve means corresponding in cross-section to the cross-section of said plug means with said ears thereon, said plug means extending into said opening and said passage means and being operable to be turned into a first position for interlocking said rail means and said bobbin holder means and also being movable into a second position for withdrawal from said bobbin holder means to thereby unlock said bobbin holder means from said rail means.

8. In combination: creel means having its major extension in horizontal direction and having substantially vertical passage means therein, bobbin holder means including cap means and also including a sleeve having its axis substantially perpendicular to the direction of the major extension of said creel means, said cap means being inserted between said sleeve means and said creel means, the upper end of said sleeve means being provided with an opening, and plug means arranged in substantially axial alignment with said sleeve means and having three pairs of ears arranged one below the other in axial direction of said plug means while being spaced from each other, the intermediate one of said pairs of ears being positively surrounded by said cap means, said opening and said passage means having a cross-section corresponding to the cross-section of said plug means with said ears, said plug means extending into said opening and said passage means and being adapted in a first position to interlock said creel means and said sleeve means and also being operable in response to a certain rotation about its axis to unlock said sleeve means to thereby permit withdrawal of the latter from said creel means.

References Cited by the Examiner
UNITED STATES PATENTS

| | | | |
|---|---|---|---|
| 2,819,855 | 1/1958 | Hewitt | 242—131 |
| 2,977,067 | 3/1961 | King | 242—130.2 |
| 3,136,017 | 6/1964 | Preziosi | 24—221.2 |

FRANK J. COHEN, *Primary Examiner.*

L. D. CHRISTIAN, *Examiner.*